United States Patent
Lei et al.

(10) Patent No.: US 12,438,939 B2
(45) Date of Patent: Oct. 7, 2025

(54) MULTI-SERVER SYSTEM AND METHOD OF REDUCING TOTAL POWER CONSUMPTION OF MULTIPLE SERVERS

(71) Applicant: Lenovo (Beijing) Limited, Beijing (CN)

(72) Inventors: Ming Lei, Beijing (CN); Caihong Zhang, Beijing (CN); Jiang Chen, Beijing (CN); Da Li, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 66 days.

(21) Appl. No.: 18/457,900

(22) Filed: Aug. 29, 2023

(65) Prior Publication Data
US 2024/0080359 A1 Mar. 7, 2024

(30) Foreign Application Priority Data
Sep. 2, 2022 (CN) .......................... 202211074205.5

(51) Int. Cl.
*H04L 67/1008* (2022.01)
*G06F 1/3203* (2019.01)
*G06F 1/3206* (2019.01)

(52) U.S. Cl.
CPC ........ *H04L 67/1008* (2013.01); *G06F 1/3203* (2013.01); *G06F 1/3206* (2013.01); *Y02D 10/00* (2018.01)

(58) Field of Classification Search
None
See application file for complete search history.

(56) References Cited

U.S. PATENT DOCUMENTS

| | | | | |
|---|---|---|---|---|
| 5,774,668 A | * | 6/1998 | Choquier | ................ G06F 9/505 709/227 |
| 7,783,747 B2 | * | 8/2010 | Abernethy, Jr. | .... H04L 67/1001 709/224 |
| 2005/0267970 A1 | * | 12/2005 | Sugizaki | ................ H04L 67/04 709/225 |
| 2010/0184432 A1 | * | 7/2010 | Yano | ................ H04W 28/0831 455/435.1 |

(Continued)

FOREIGN PATENT DOCUMENTS

JP 6402658 B2 * 10/2018

*Primary Examiner* — Lance Leonard Barry
(74) *Attorney, Agent, or Firm* — ANOVA LAW GROUP, PLLC

(57) ABSTRACT

A method for reducing a total power consumption of multiple servers includes determining an efficiency distribution of a power supply unit of each of the multiple servers, the efficiency distribution including a working efficiency of the power supply unit varied according to a utilization ratio of the power supply unit, wherein the efficiency distribution of the power supply unit of at least one of the multiple servers is obtained based on a measurement performed by a BMC; retrieving, by a manager, the efficiency distribution of the power supply unit of each of the multiple servers; and performing load balancing on the multiple servers through the manager to reduce the total power consumption of the multiple servers. The load balancing is performed based at least in part on the efficiency distribution of the power supply unit of one or more of the multiple servers.

14 Claims, 3 Drawing Sheets

(56) References Cited

U.S. PATENT DOCUMENTS

| | | | |
|---|---|---|---|
| 2011/0095607 A1* | 4/2011 | Humphrey | H02J 9/005 |
| | | | 307/31 |
| 2016/0320818 A1* | 11/2016 | Huang | G06N 20/00 |
| 2016/0342186 A1* | 11/2016 | Ragupathi | G06F 1/189 |
| 2016/0373520 A1* | 12/2016 | Kumar | H04L 67/02 |
| 2017/0255240 A1* | 9/2017 | Matteson | G06F 9/5094 |
| 2018/0074560 A1* | 3/2018 | Matteson | G06F 1/3296 |
| 2020/0394081 A1* | 12/2020 | Manousakis | G06F 9/45558 |
| 2023/0026041 A1* | 1/2023 | Jose | G06F 11/3086 |
| 2024/0080359 A1* | 3/2024 | Lei | G06F 1/3203 |

* cited by examiner

FIG. 4

| | Method 1 | | | Method 2 | | |
|---|---|---|---|---|---|---|
| | A | B | C<br>Turn Off One PSU | A | B | C |
| PSU Utilization Rate | 50% | 50% | 23% | 37.80% | 37.80% | 37.80% |
| PSU Efficiency | 96% | 96% | 92.50% | 94.50% | 94.50% | 94.50% |
| PSU AC Power Consumption | 750W | 750W | 173W | 563.7W | 563.7W | 563.7W |
| PSU DC Power Consumption | 720W | 720W | 160W | 533.3W | 533.3W | 533.3W |
| Total AC Power Consumption | 1673W | | | 1691W | | |
| Total DC Power Consumption | 1600W | | | 1600W | | |

FIG. 5

| | Method 1 | | | Method 2 | | |
|---|---|---|---|---|---|---|
| | A<br>Turn Off One PSU | B | C<br>Turn Off Node | A | B | C |
| PSU Utilization Rate | 48.7% | 52.9% | 0.0% | 26.2% | 26.2% | 26.2% |
| PSU Efficiency | 96.0% | 95.7% | 0.0% | 93.2% | 93.2% | 93.2% |
| PSU AC Power Consumption | 750W | 396.7W | 0 | 393.4W | 393.4W | 393.4W |
| PSU DC Power Consumption | 720W | 380W | 0 | 366.7W | 366.7W | 366.7W |
| Total AC Power Consumption | 1146.7W | | | 1180.2W | | |
| Total DC Power Consumption | 1100W | | | 1100W | | |

MULTI-SERVER SYSTEM AND METHOD OF REDUCING TOTAL POWER CONSUMPTION OF MULTIPLE SERVERS

RELATED APPLICATION(S)

This application claims priority to Chinese Patent Application No. 202211074205.5 filed with the National Intellectual Property Administration, People's Republic of China on Sep. 2, 2022, which is incorporated herein by reference in entirety.

FIELD OF THE TECHNOLOGY

The present disclosure relates to servers, in particular to energy consumption of servers.

BACKGROUND

In recent years, with the use of blade servers and high-density servers, the power consumption of data centers has been rapidly increasing. Energy saving has become a common challenge for data center services. In 2018 alone, data centers around the world were estimated to consume 205 terawatt-hours of electricity. A large data center may have a capacity of 100 megawatts, which means consuming 85400 ten-thousand kilowatt-hours per year. Servers account for about 43% of the total power consumption of data centers (about 367 million kilowatt-hours). If the power consumption of servers may be reduced by 1%, the saved electricity may cover more than 700 households. Therefore, every percentage point saved in server power consumption translates into significant value and cost savings. In addition to this, carbon dioxide emissions are an important consideration for most countries. Electricity consumption in data centers generates significant carbon dioxide emissions, so reducing electricity consumption also contributes to improvements in reduction of carbon dioxide emissions.

Certain existing methods for reducing server power consumption are simple but inefficient. For example, cooling efficiency may be improved, and power may be saved by placing servers in different locations in the room to improve the cooling airflow path. Replacing old or obsolete equipment with new, more efficient equipment is another option. Identifying and eliminating underutilized servers is yet another approach.

SUMMARY

Embodiments of the present disclosure provide a method and system for intelligently balancing workloads using efficiency curves of PSUs (power supply units) and managers to reduce overall power consumption of servers.

In one aspect, the present disclosure provides a method for reducing a total power consumption of multiple servers, the method including: determining a power consumption characteristic of each of the multiple servers; retrieving, by a manager, the power consumption characteristic of the each of the multiple servers; and performing load balancing on the multiple servers through the manager to reduce the total power consumption of the multiple servers, wherein, the load balancing is performed based at least in part on the power consumption characteristic of one or more of the multiple servers.

In certain embodiment(s), the power consumption characteristic is an efficiency distribution of a power supply unit, the efficiency distribution including a working efficiency of the power supply unit varied according to a utilization ratio of the power supply unit.

In certain embodiment(s), the power unit efficiency distribution is in general a normal distribution.

In certain embodiment(s), the power consumption characteristic of at least one of the multiple servers is obtained by measurement performed by a designated processor in the server.

In certain embodiment(s), the method further includes monitoring the total power consumption of the multiple servers by the manager; and dynamically performing the load balancing.

In certain embodiment(s), the designated processor is a baseboard management controller (BMC), and the manager is a software running on one of the multiple servers or on an additional computing device.

In certain embodiment(s), the load balancing includes transferring a service request received by a first server in the multiple servers to one or both of a second server and a third server of the multiple servers.

In certain embodiment(s), a first server of the multiple servers includes two or more power supply units, and the load balancing comprises transferring a service request received by the first server to a second server of the multiple servers, and turning off at least one of the two or more power supply units of the first server.

In certain embodiment(s), the load balancing includes transferring a service request received by a first server of the multiple servers to other servers of the multiple servers, so that a working efficiency of the power supply unit of the first server is in a maximum range.

In another aspect, the present disclosure provides a multi-server system, the multi-server system includes: multiple servers, each of the multiple servers having a power consumption characteristic; and a manager, configured to retrieve the power consumption characteristic of the each of the multiple servers, where, the manager is further configured to perform load balancing based at least in part on the power consumption characteristic of one or more of the multiple servers to reduce a total power consumption of the multiple servers.

In certain embodiment(s), each of the multiple servers includes a designated processor, and the designated processor is configured to measure the power consumption characteristic.

In certain embodiment(s), the designated processor is a baseboard management controller (BMC), and the manager is a software running on one of the multiple servers or on an additional computing device.

The present disclosure enables better overall power efficiency for systems containing multiple servers and helps reduce data center energy consumption and costs. Compared with certain existing technology that only aims to improve the heat dissipation effect of the server, the present disclosure may fundamentally reduce the power consumption of the server by improving the efficiency of the power supply unit, and at the same time, the heat dissipation is accordingly improved with the reduction of power consumption. In addition, certain existing load redistribution technology does not reduce the overall power consumption of multiple servers, and therefore does not help to save operating costs caused by power consumption. The system and method provided by the embodiment(s) of the present disclosure may continuously monitor the overall power consumption of the server during the operating duration of the server, in determine whether the server is running in a desirable energy efficiency range, and may automatically and dynamically perform load balancing as necessary. Accordingly, power consumption is minimized and reduces heat generation is reduced, without compromising server responsiveness requirements.

BRIEF DESCRIPTION OF THE DRAWINGS

A further understanding of the features and advantages of the present disclosure may be obtained by reference to the specification and the accompanying drawings; in these drawings, like elements are numbered alike or the same. In certain embodiment(s), a sublabel is placed after a label and a hyphen to denote one of many similar components. When a label is mentioned without specific mention of an existing sublabel, all such similar components are included.

FIG. 4 is a schematic comparison of the power consumption of the system in FIG. 1 before and after load balancing, according to certain embodiment(s) of the present disclosure.

FIG. 5 is a schematic comparison of the power consumption of the system in FIG. 1 before and after load balancing, according to certain embodiment(s) of the present disclosure.

DETAILED DESCRIPTION

According to the embodiment(s) of the present disclosure, via improving the efficiency of the power supply unit of the server, an overall power consumption of multiple servers is thus reduced. Other different benefits and advantages provided by the various embodiments of the present disclosure may be readily understood from the following description.

Certain terms are used, for example, in the description and claims to refer to particular components. Hardware manufacturers may use different terms to refer to the same component. The specification and claims do not necessarily use the difference in name as a way to distinguish components, but may in certain embodiment(s) use the difference in function of components as a criterion for distinguishing. As mentioned throughout the specification and claims, "comprising" is an open term, so it should be interpreted as "including but not limited to". When applicable, "Approximately" or "about" refers to that within an acceptable error range, a technical problem may be solved within a certain error range to achieve an intended technical effect.

Figure 1:
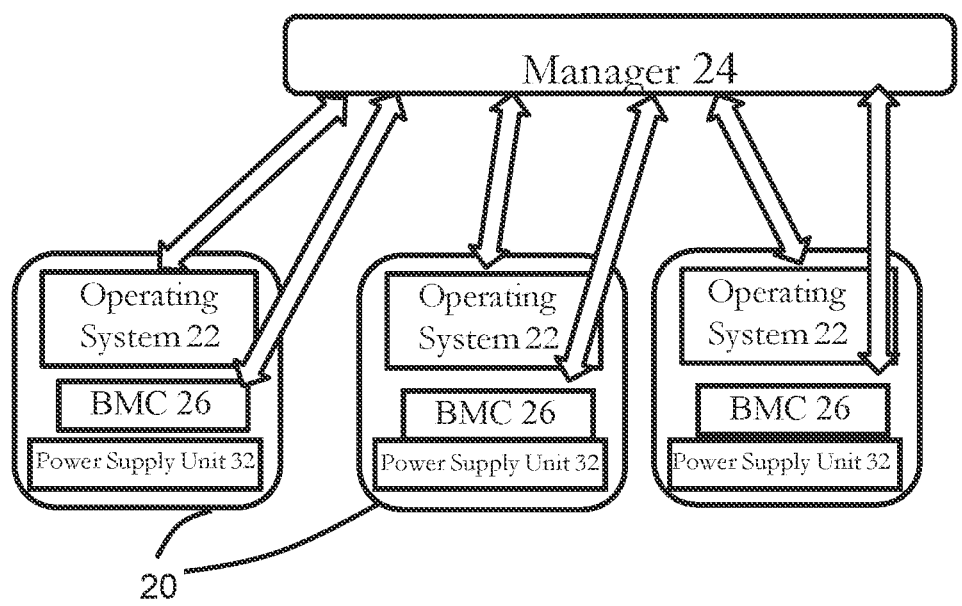
FIG. 1 is a schematic structural diagram of a multi-server system according to certain embodiment(s) of the present disclosure.

With reference to FIG. 1, a multi-server system according to certain embodiment(s) of the present disclosure is shown in FIG. 1. The multi-server system includes two or more servers 20 which are all connected to a manager 24, such that the manager 24 may communicate with each of the servers 20. Manager 24 is a computing device running management software for power-based load balancing. The computing device may either be dedicated to server management but not itself performing server functions such as responding to service requests, or may also be used as a server. In certain embodiment(s), each of the servers 20 shown in FIG. 1 may have the same or different hardware or software configurations. In certain embodiment(s), the servers 20 all have an operating system 22 and a BMC (Baseboard Management Controller) 26. In certain embodiment(s), the operating system 22 and the BMC 26 may each independently communicate with the manager 24, such as providing information to the manager 24 or receiving instructions from the manager 24. As shown in FIG. 1, operating system 22 may transmit to the manager 24 the load status of server 20 where the operating system 22 is located, and may also receive instructions from manager 24 to adjust the load status of the server 20. The BMC 26 may transmit to the manager 24 a power curve of a power supply unit 32 of the server 20. The information thus transmitted is described in detail below.

Each of the servers 20 shown in FIG. 1 also has a power supply unit 32. In certain embodiment(s), the power supply unit 32 is the PSU (Power Supply Unit) of each of the servers 20. There may be one or more power supply units 32 in each server 20, but only one power supply unit 32 is shown in FIG. 1 for the sake of brevity. The power supply unit 32 is a component, in certain embodiment(s), that provides power supply for other components of the server 20, such as a motherboard and a storage device. In certain embodiment(s), information of the power supply unit 32, such as real-time power consumption and available capacity (or utilization rate) of the power supply unit 32, may be read by the BMC 26, and power consumption characteristics of the server 20 may then be obtained by calculation.

The power consumption characteristics of each server 20 include an efficiency distribution of the power supply unit 32 according to that server 20. In certain embodiment(s), the difference in the utilization rate of the power supply unit 32 may lead to a change in the working efficiency of the power supply unit 32. In certain embodiment(s), the utilization rate ranges from 0% to 100%. For example, when the utilization rate is 100%, the power supply unit 32 outputs power at full load. Similarly, the range of working efficiency is also 0%-100%, and when the working efficiency is 100% (under ideal conditions), the energy wasted by the power supply unit 32 during work is the smallest, that is, when the AC (Alternating Current) energy input by the power supply unit 32 is converted to the output DC (Direct Current) energy, the loss is minimal. Therefore, every percentage point increase in the efficiency of the power supply unit 32 means a saving in the overall power consumption of server 20. For example, if a server 20 is running at 1000 W and the power supply unit 32 is 90% efficient, that means 900 W of the 1000 W is used to run the workload and the remaining 100 W is consumed by the power supply unit 32 itself. If the efficiency goes up to 91%, the overall power consumption of the server 20 running the same workload is 989 W (900 W/91%=989 W), which means a power saving of 11 W (1%).

Figure 2:
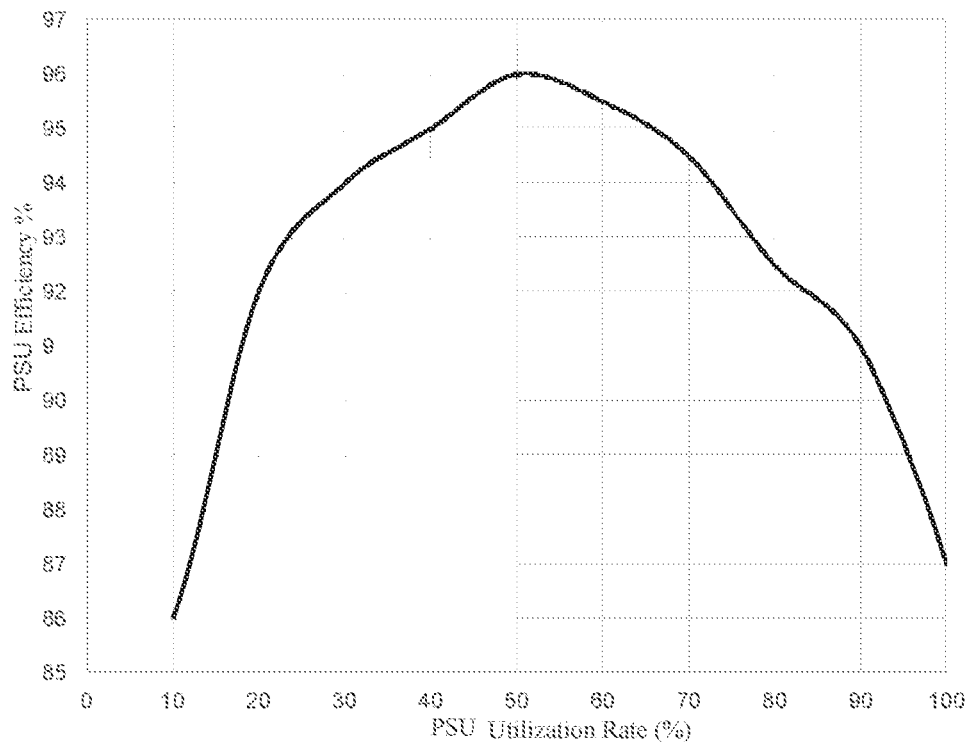
FIG. 2 is a schematic diagram showing a shape of the PSU efficiency curve for a server in the system of FIG. 1, according to certain embodiment(s) of the present disclosure.

FIG. 2 shows an exemplary PSU efficiency curve for one server 20 in FIG. 1, showing changes in the efficiency of the power supply unit 32 as the utilization rate of the power supply unit 32 is varied. From FIG. 2 it may be seen that the maximum efficiency of the power supply unit 32 in this example (the apex of the curve) is around 96%, but not when the utilization rate of the power supply unit 32 is at 100%. Instead, as may be seen in FIG. 2, the highest or maximum efficiency occurs when the utilization rate is about 48%-52%. That is, if the utilization rate is too high or too low, efficient operation of the power supply unit 32 may not be achieved. In fact, the efficiency distribution of the power supply unit 32 may be seen to generally be a normal distribution, of a bell-shaped distribution. A maximum efficiency interval may be defined, for example in FIG. 2, the maximum efficiency interval may be defined as the interval where the PSU efficiency is equal to or greater than 94%, this maximum efficiency interval thus corresponds to about 30%-73% PSU utilization rate. The maximum efficiency range may be customized, which may be a wider or narrower efficiency range.

In certain embodiment(s), the PSU efficiency curve of each server 20 in FIG. 1 may be different from each other. This is because the hardware and software configuration of each server 20 may be different. Different from the power consumption of individual components, the power consumption of the power supply unit 32 is the power consumption of the entire server 20, so even a small difference in any hardware or software (such as one more resistor or one less resistor on the main board of the server 20) will affect the power consumption of the server 20. However, the shape of the PSU efficiency curve is generally the same for all servers 20, just the exact values may vary. For example, the apex of the PSU efficiency curve for certain server 20 might be where the utilization rate is 60%.

Figure 3:
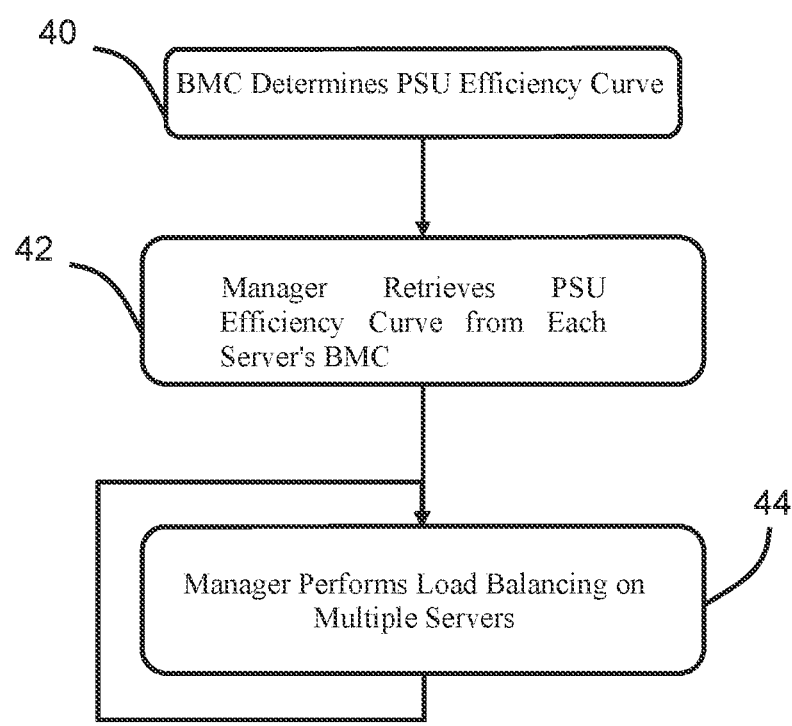
FIG. 3 is a schematic flow chart of a method for the system in FIG. 1 to perform load balancing based on power consumption, according to certain embodiment(s) of the present disclosure.

In certain embodiment(s), the present disclosure provides a method of load balancing based on power consumption for a multi-server system shown in FIG. 1. The main steps of the method are shown in FIG. 3. First, before load balancing may be performed, the BMC 26 of each server 20 runs a power calibration, and measures the efficiency of the power supply unit 32 during the process, to obtain an efficiency distribution of the power supply unit 32 (for example, step 40 in FIG. 3). BMC is a designated processor in the server, which is independent of the main processor (CPU) in the server, may be started independently, and may read various states of the server and communicate with external devices via network. The efficiency distribution is calculated by the BMC 26 in the form of a PSU efficiency curve and transmitted to the manager 24. However, the efficiency distribution does not necessarily need to be stored in the form of a curve, but may also be stored in other ways (such as lookup tables, curve fitting formulas, or the like). The PSU efficiency curves shown in FIG. 2 are employed merely as a more straightforward way to represent the efficiency distribution, particularly for maintenance personnel to visualize the efficiency distribution.

At step 42, the manager 24 reads the PSU efficiency curve from the BMC 26 of each server 20, such as mirroring the efficiency curve of the power supply unit 32. Through this step, the manager 24 may know the respective efficiency curves of the power supply units 32 of all the servers 20 in the entire system, to prepare for the subsequent load balancing based on power consumption optimization. At step 44, the manager 24 issues instructions to the operating systems 22 of the associated servers 20 to deploy the workload of each server 20. During the operation of multiple servers 20, the manager 24 may continuously monitor the total power consumption of the servers 20, and dynamically perform load balancing steps, and in certain embodiment(s), step 44 is not performed only once, but may be performed multiple times as desired (for example, every half hourly or every hourly). Accordingly, manager 24 constantly balances workloads and calculates the overall power consumption of all servers 20 with the goal of optimizing overall power efficiency to minimize overall power consumption while maintaining service commitments.

The method by which manager 24 performs load balancing is by transferring the workload among the plurality of servers 20. By increasing the workload of the lightly loaded server 20 and reducing the workload of the heavily loaded server 20, the working efficiency of the respective power supply units 32 of multiple servers 20 may be moved to the top of the respective efficiency curves as much as possible. Implementation methods of load balancing, such as distribution algorithm, strategy for routing a certain service request to a specific server 20, or the like, may be any suitable implementation methods. However, different from the load balancing of certain existing technology, the purpose of the load balancing in certain embodiment(s) of the present disclosure is to minimize the overall power consumption of the multi-server system. In certain embodiment(s), the manager 24 obtains the real-time power consumption and power capacity of the power supply unit 32 from the respective BMC 26 of each server 20, and calculates the utilization rate of the power supply unit 32, and adjusts the workload of a certain server based on the utilization rate and the PSU efficiency curve 20, such that the power consumption of the entire system falls into the most efficient range.

In the adjustment process, there are many strategies that may be used, suitable strategies are not limited to a certain fixed adjustment method. For example, one way to adjust the load is when server 20 is so heavily loaded that its power supply unit 32 cannot operate within a highest or maximum efficiency range, then a portion of the service request received by the server 20 is transferred to one or more other servers 20 of the plurality of servers 20, to realize a reduction of the utilization rate of the power supply unit 32 of the server 20. This adjustment may make the work efficiency of the power supply unit 32 be in the highest or maximum range.

If one server 20 or a portion of servers 20 may handle all the workload after adjusting it/their power efficiency to the highest level, then the remainder of the servers 20 in the system may be shut down, to avoid power consumption of those shutdown server 20. In other words, such an adjustment strategy transfers the service requests received by one or more of the multiple servers 20 to other servers of the multiple servers 20.

In certain embodiment(s), when some of the servers 20 in the system are to run under light load, one or more power supply units 32 of these servers 20 may be turned off, allowing the remaining power supply units 32 to still operate at maximum efficiency. For example, when a server 20 with two power supply units 32 must run a light load, one of the power supply units 32 is turned off, leaving only one power supply unit 32 powered on. And part of the service request received by server 20 may be transferred to other server(s) 20 among the plurality of servers 20. Accordingly, server 20, although having two power supply units 32, may run only half the load (using only one power supply unit 32), but the remaining power supply unit 32 may work at maximum efficiency.

FIGS. 4-5 show a particular example of load balancing by the manager 24. In this scenario, there are three servers A, B, C in a multi-server system, each with two 750 W power supply units. To accommodate the service commitment, and in the example shown in FIG. 4, an overall workload of the system consumes 1600 W (DC). There are two ways to adjust the workload as shown in FIG. 4. Method 2 is to distribute the load of the three servers roughly evenly, such that the utilization rate of the power supply units per server is about 37.6%, resulting in a power supply unit efficiency of 94.5% per server. The power consumption per server is 563.7 W (AC), while the input power consumption (AC) for the entire system is 1691 W. Compared to method 2, method 1 does not distribute the load evenly, but rather turns off one of the two power supply units of a server (C in FIG. 4).

Although the utilization rate of the power supply unit of the server C is only 23% and the working efficiency is 92.5%, the power supply unit 32 of the other two servers A and B has a working efficiency of 96% because the utilization rate increases to 50%. Accordingly, the input power consumption (AC) of the entire system is only 1673 W, which reflects more than 1% in AC saving, compared to 1691 W by method 1. In the scenario of FIG. 4, method 1 is better.

In certain embodiment(s), as shown in FIG. 5, there are also two ways to adjust the workload. Method 2 is to distribute the loads of the three servers A, B, and C roughly evenly, so the utilization rate of the power supply unit 32 of each server is about 26.2%, resulting in the working efficiency of the power supply unit of each server being 93.2%. The power consumption per server is 393.4 W (AC), while the input power consumption (AC) for the entire system is 1180.2 W. Compared with method 2, instead of distributing the load evenly, method 1 shuts down one server (C in FIG. 5) (that is, does not respond to service requests), and one of the two power supply units 32 of the other server (B in FIG. 5) is also turned off. With this strategy, server A's power supply unit utilization rate is 96% and operating efficiency is 95.7%, while server B's utilization rate is increased to 52.9% with one power supply unit turned off, resulting in an operating efficiency of 95.7%. Accordingly, the input power consumption (AC) of the entire system is only 1146.7 W, which reflects more than 3% AC savings compared to method 1's 1180.2 W. In the scenario of FIG. 5, method 1 is better.

In view of the embodiments described herein, various modifications, alternative structures, and equivalents may be used without having to depart from the essence of the present disclosure. Accordingly, the description should not be taken as limiting the scope of the present disclosure as defined by the following claims.

For example, although three servers are shown in FIG. 1, it should be noted that the number of servers shown in this figure is only for illustration purposes due to space limitations, and the number of servers included in the system according to the present disclosure may be more than three and may also be less than three. In fact, the method and system of the present disclosure are not intended to cast limitation on the number of servers. Any suitable number of servers may be employed in the method of the present disclosure in performing load balancing based on power consumption.

What is claimed is:

1. A method for reducing total power consumption of multiple servers, the method comprising:
    determining an efficiency distribution of a power supply unit of each of the multiple servers, the efficiency distribution including a working efficiency of the power supply unit varied according to a utilization ratio of the power supply unit, wherein the efficiency distribution of the power supply unit of at least one of the multiple servers is obtained based on a measurement performed by a baseboard management controller (BMC) in the at least one of the multiple servers;
    retrieving, by a manager, the efficiency distribution of the power supply unit of each of the multiple servers; and
    performing load balancing on the multiple servers through the manager to reduce the total power consumption of the multiple servers, wherein, the load balancing is performed based at least in part on the efficiency distribution of the power supply unit of one or more of the multiple servers.

2. The method according to claim 1, further comprising:
    monitoring the total power consumption of the multiple servers by the manager; and
    dynamically performing the load balancing.

3. The method of claim 1, wherein the manager is software running on one of the multiple servers or on an additional computing device.

4. The method according to claim 1, wherein the load balancing comprises transferring a service request received by a first server of the multiple servers to one or both of a second server and a third server of the multiple servers.

5. The method according to claim 1, wherein a first server of the multiple servers includes two or more power supply units, and the load balancing comprises transferring a service request received by the first server to a second server of the multiple servers, and turning off at least one of the two or more power supply units of the first server.

6. The method according to claim 1, wherein the load balancing comprises transferring a service request received by a first server of the multiple servers to other servers of the multiple servers, so that a working efficiency of the power supply unit of the first server is in a maximum range.

7. A multi-server system, comprising:
    multiple servers, each of the multiple servers having an efficiency distribution of a power supply unit, the efficiency distribution including a working efficiency of the power supply unit varied according to a utilization ratio of the power supply unit, wherein each of the multiple servers includes a baseboard management controller (BMC), and the BMC is configured to measure the efficiency distribution of the power supply unit; and
    a manager, configured to retrieve the efficiency distribution of the power supply unit of each of the multiple servers, wherein, the manager is further configured to perform load balancing based at least in part on the efficiency distribution of the power supply unit of one or more of the multiple servers to reduce a total power consumption of the multiple servers.

8. The multi-server system according to claim 7, wherein the manager is software running on one of the multiple servers or on an additional computing device.

9. The multi-server system of claim 7, wherein the manager is further configured to monitor the total power consumption of the multiple servers.

10. The multi-server system of claim 7, wherein the load balancing comprises transferring a service request received by a first server of the multiple servers to one or both of a second server and a third server of the multiple servers.

11. The multi-server system of claim 7, wherein a first server of the multiple servers includes two or more power supply units, and the load balancing comprises transferring a service request received by the first server to a second server of the multiple servers, and turning off at least one of the two or more power supply units of the first server.

12. The multi-server system of claim 7, wherein the load balancing comprises transferring a service request received by a first server of the multiple servers to other servers of the multiple servers, so that a working efficiency of the power supply unit of the first server is in a maximum range.

13. A non-transitory computer-readable storage medium storing computer program instructions executable by at least one processor to perform:
    determining an efficiency distribution of a power supply unit of each of multiple servers, the efficiency distribution including a working efficiency of the power supply unit varied according to a utilization ratio of the power supply unit, wherein the efficiency distribution of the power supply unit of at least one of the multiple servers is obtained based on a measurement performed by a baseboard management controller (BMC) in the at least one of the multiple servers;

retrieving, by a manager, the efficiency distribution of the power supply unit of each of the multiple servers; and performing load balancing on the multiple servers through the manager to reduce the total power consumption of the multiple servers, wherein, the load balancing is performed based at least in part on the efficiency distribution of the power supply unit of one or more of the multiple servers.

14. The non-transitory computer-readable storage medium according to claim 13, wherein the computer program instructions are further executable by the at least one processor to perform:

monitoring the total power consumption of the multiple servers by the manager; and dynamically performing the load balancing.

* * * * *